US012123235B2

(12) United States Patent
Rupp et al.

(10) Patent No.: US 12,123,235 B2
(45) Date of Patent: Oct. 22, 2024

(54) GUIDE ASSEMBLY FOR GUIDING AT LEAST ONE SLIDING DOOR OR FOLDING SLIDING DOOR

(71) Applicant: Julius Blum GmbH, Hoechst (AT)

(72) Inventors: Matthias Rupp, Hohenweiler (AT); Kai Hollenstein, Hoechst (AT)

(73) Assignee: Julius Blum GmbH, Hoechst (AT)

(*) Notice: Subject to any disclaimer, the term of this patent is extended or adjusted under 35 U.S.C. 154(b) by 262 days.

(21) Appl. No.: 17/839,930

(22) Filed: Jun. 14, 2022

(65) Prior Publication Data

US 2022/0364403 A1 Nov. 17, 2022

Related U.S. Application Data

(63) Continuation of application No. PCT/AT2020/060457, filed on Dec. 11, 2020.

(30) Foreign Application Priority Data

Dec. 19, 2019 (AT) .............................. A 51115/2019

(51) Int. Cl.

| | |
|---|---|
| ***E05D 15/06*** | (2006.01) |
| ***E05D 15/26*** | (2006.01) |
| ***E06B 3/46*** | (2006.01) |

(52) U.S. Cl.

CPC ....... *E05D 15/0652* (2013.01); *E05D 15/264* (2013.01); *E06B 3/4663* (2013.01); (Continued)

(58) Field of Classification Search

CPC .............. E05D 15/264; E05D 15/0652; E05D 15/0626; E05D 15/063; E06B 3/4663; (Continued)

(56) References Cited

U.S. PATENT DOCUMENTS 1,036,589 A * 8/1912 Eggleston ........... E05D 15/0613 16/94 R
3,636,588 A * 1/1972 Ferris .................. E05D 15/0652 16/92

(Continued)

FOREIGN PATENT DOCUMENTS

CN 110199081 9/2019
EP 1 197 624 4/2002

(Continued)

OTHER PUBLICATIONS

International Search Report issued Mar. 4, 2021 in International (PCT) Application No. PCT/AT2020/060457.

*Primary Examiner* — Daniel J Rohrhoff

(74) *Attorney, Agent, or Firm* — Wenderoth, Lind & Ponack, L.L.P.

(57) ABSTRACT

A guide assembly is provided for guiding a sliding door or folding sliding door relative to a stationary furniture part. The guide assembly includes a guide rail to be secured on the stationary furniture part; a guide device having a running mechanism to be moveably mounted on the guide rail and having a fastening device for securing the guide device on the sliding door or folding sliding door; and at least two holding devices, each having an installing section for allowing mounting of the holding devices on a frame and a catch mechanism. The holding devices can be secured on the guide rail by the catch mechanism, and at least one, preferably both, of the at least two holding devices has a sheet metal bent part, preferably formed of the sheet metal bent part.

24 Claims, 12 Drawing Sheets

(52) U.S. Cl.
CPC ..... *E05Y 2201/11* (2013.01); *E05Y 2201/684* (2013.01); *E05Y 2600/41* (2013.01); *E05Y 2600/53* (2013.01); *E05Y 2600/626* (2013.01); *E05Y 2900/20* (2013.01)

(58) Field of Classification Search
CPC ........... E05Y 2201/11; E05Y 2201/684; E05Y 2600/41; E05Y 2600/53; E05Y 2600/626; E05Y 2900/20
See application file for complete search history.

(56) References Cited

U.S. PATENT DOCUMENTS

| | | | | |
|---|---|---|---|---|
| 3,983,600 | A * | 10/1976 | Smith | E05D 15/08 52/718.01 |
| 4,424,605 | A * | 1/1984 | Squires | E05D 15/0652 16/94 R |
| 4,845,807 | A | 7/1989 | Rooney | |
| 5,012,850 | A * | 5/1991 | Schrader | E06B 9/323 160/902 |
| 5,398,902 | A * | 3/1995 | Crowe | E05D 15/0652 248/300 |
| 5,515,901 | A * | 5/1996 | Hall | E06B 3/481 160/206 |
| 6,647,590 | B2 | 11/2003 | Haab et al. | |
| 9,057,216 | B2 * | 6/2015 | Bortoluzzi | E05F 5/00 |
| 10,202,762 | B2 | 2/2019 | Sollohub et al. | |
| 10,208,528 | B2 | 2/2019 | Sebastian et al. | |
| 10,400,493 | B2 | 9/2019 | Gabl | |
| 10,753,133 | B2 | 8/2020 | Kohlweiss | |
| 11,136,804 | B2 | 10/2021 | Rupp et al. | |
| 2002/0044824 | A1 | 4/2002 | Haab et al. | |
| 2010/0320887 | A1 * | 12/2010 | Bortoluzzi | E05D 15/0652 24/303 |
| 2015/0008811 | A1 * | 1/2015 | Ishii | E06B 3/5045 312/322 |
| 2017/0074028 | A1 | 3/2017 | Sebastian et al. | |
| 2017/0183867 | A1 | 6/2017 | Sollohub et al. | |
| 2017/0260789 | A1 | 9/2017 | Gabl | |
| 2018/0119470 | A1 * | 5/2018 | Kohlweiss | E05D 15/58 |
| 2018/0320430 | A1 * | 11/2018 | Wei | E05F 5/027 |
| 2019/0301216 | A1 | 10/2019 | Rupp et al. | |

FOREIGN PATENT DOCUMENTS

| | | |
|---|---|---|
| EP | 2 578 786 | 4/2013 |
| EP | 3 235 982 | 10/2017 |
| FR | 2 833 213 | 5/2022 |
| JP | 2010-506639 | 3/2010 |
| JP | 2018-500483 | 1/2018 |
| JP | 2018-524501 | 8/2018 |
| KP | 10-2016-0077052 | 7/2016 |
| TW | 201837292 | 10/2018 |
| WO | 2008/046628 | 4/2008 |
| WO | 2008/071016 | 6/2008 |
| WO | 2009/025607 | 2/2009 |
| WO | 2016/081963 | 6/2016 |
| WO | 2017/000006 | 1/2017 |
| WO | 2018/129574 | 7/2018 |

* cited by examiner

GUIDE ASSEMBLY FOR GUIDING AT LEAST ONE SLIDING DOOR OR FOLDING SLIDING DOOR

BACKGROUND OF THE INVENTION

The invention relates to a guide assembly for guiding at least one sliding door or folding sliding door relative to a stationary furniture part. The guide assembly includes:

- at least one guide rail to be fastened on the stationary furniture part,
- at least one guide device with a running mechanism, which can be mounted displaceably on the at least one guide rail, and a fastening device for fastening the at least one guide device on the at least one sliding door or folding sliding door, and
- at least two holding devices, which each have an installing section for installing the holding devices on a screen and at least one catch mechanism, wherein the holding devices can be fastened on the at least one guide rail by means of the at least one catch mechanism.

The invention moreover relates to a piece of furniture comprising a stationary furniture part, at least one sliding door or folding sliding door and at least one such guide assembly for guiding the at least one sliding door or folding sliding door relative to the stationary furniture part. Furthermore, the invention relates to a method for installing such a piece of furniture.

A guide assembly for guiding a sliding door is already known from the specification WO 2008/071016 A1, wherein a guide rail is fastened under a cabinet base and a screen has several holding devices produced by an injection-molding or die-casting method in each case with two legs and a catch means, in order to fasten the screen on the guide rail.

A disadvantage of the state of the art is that with a screen installed on the guide rail the holding devices are only supported on the guide rail via a region between a leg and the catch means. The negative effect is thereby caused that when the sliding door is moved along the guide rail and/or in the case of a loading at the bottom, the screen can detach from the guide rail. In addition, through a design of the holding devices using a casting method a holding device is provided which has a large amount of material and at the same time low stability of load-bearing structures of the holding device. This causes an instability of the screen after the screen is installed on the guide rail, wherein, due to the single contact area of the holding device on the guide rail, there is an increased tendency for the screen to fall off the cabinet in the case of minimal forces on the screen. A further disadvantage is that the guide assembly is structurally designed in such a way that only an underside of the cabinet is provided with a screen fastened via the holding devices.

SUMMARY OF THE INVENTION

The object of the present invention is therefore to specify a guide assembly that is improved compared with the state of the art, in which the disadvantages of the state of the art are at least partially remedied, and which is characterized in particular by a positionally stable positioning of a screen on a guide rail via holding devices, wherein an easy installation and/or deinstallation of the screen on the guide rail is guaranteed.

Therefore, according to the invention, at least one of the, preferably both of the, at least two holding devices has a sheet metal bent part, preferably consists of the sheet metal bent part.

This first makes it possible for the holding device to be adaptable to a specific structural design of the at least one guide rail shape via a bending of the sheet metal bent part.

Furthermore, the holding device which comprises the sheet metal bent part is easy to produce, whereby manufacturing costs can be saved.

Added to this is the positive feature that the holding device comprising the sheet metal bent part can be arranged on the at least one guide rail via a plurality of contacting points, wherein a detachment of at least one screen from the at least one guide rail is prevented.

As stated at the beginning, protection is also sought for a piece of furniture comprising a stationary furniture part, at least one sliding door or folding sliding door and at least one such guide assembly for guiding the at least one sliding door or folding sliding door relative to the stationary furniture part, wherein the piece of furniture has at least one screen on which the at least two holding devices are installed via the installing sections, wherein the holding devices are fastened on the at least one guide rail by means of the at least one catch mechanism and thus hold the screen on the at least one guide rail.

The at least one guide assembly makes an easy installation and/or deinstallation of the at least one screen on the at least one guide rail via the at least two holding devices possible, wherein an esthetically appealing piece of furniture is provided.

As stated at the beginning, protection is also sought for a method for installing such a piece of furniture, wherein the following method steps, preferably chronological in the sequence specified, are carried out:

- the at least one guide rail is fastened on the stationary furniture part, preferably above a top panel of the piece of furniture,
- the at least two holding devices are installed on the at least one screen via the installing sections,
- the at least one screen is fastened on the at least one guide rail by means of the at least one catch mechanism of the holding device.

A friction-locking of the at least one screen via the at least two holding devices as well as the at least one guide rail on the stationary furniture part is thereby made possible, wherein an easy installation and/or deinstallation of the at least one screen on and/or from the piece of furniture is guaranteed.

According to an advantageous design of the invention, the at least one guide rail has a long side with at least one track for the at least one running mechanism, wherein a holding element is provided on the long side, which can be connected to the at least one catch mechanism of the holding devices in order to fasten the holding devices on the at least one guide rail.

The at least one track makes a low-friction travel of the at least one guide device possible. The holding devices can be connected to the at least one guide rail before or after the installation of the at least one guide device. First of all, the at least one guide device is preferably attached to the at least one guide rail and then the at least one screen is attached to the at least one guide rail via the holding devices. The at least one guide device is particularly preferably displaced away from the at least one guide rail before the installation of the screen.

As the holding element for receiving the holding devices is arranged on the long side, the at least one guide rail can be formed in one piece, wherein separate devices for arranging the holding devices and the at least one guide device are not necessary.

It is advantageously provided that at least one, preferably both, of the at least two holding devices:

- has at least one contact surface which is comprised by the installing section and can be brought into contact, preferably flatly, with the at least one guide rail and/or a rear side of the screen, and/or
- has at least one opening for receiving an installing means, with which the holding device can be installed on the screen, wherein the at least one opening is comprised by the installing section, and/or
- has at least one support device, preferably formed resilient, with which the holding device can be supported in the vertical direction on the at least one guide rail in the use position, preferably wherein the at least one support device has a cross web protruding transversely with respect to a contact surface and/or a tab arranged parallel, and preferably offset via a step, to a contact surface, and/or
- is formed symmetrical with respect to a center plane.

The at least one contact surface makes a flat contact between the holding devices and the screen possible, which causes a positionally stable positioning of the holding devices on the screen.

Through the at least one opening, the holding devices can be fixed on the screen via fastening means and/or installing means. In general, a fastening via a clip, a Velcro® fastener, an adhesive region, etc. is also possible.

The at least one support device stops the screen from slipping off in the vertical direction in the use position through a contact with the at least one guide rail. Furthermore, with at least two holding devices the screen is oriented in a defined manner to a horizontal and/or spaced apart in a defined manner from a top panel in the vertical direction.

A supporting of the holding devices on the at least one guide rail—for example with rounding radii and/or manufacturing inaccuracies—is particularly promoted by the protruding cross web and/or the tab. The supporting of the tab and/or the cross web on the at least one guide rail can thereby be effected flat.

If the holding device is formed symmetrical, the installation of the screen on the at least one guide rail is made easier as an orientation of the holding device around the center plane does not need to be taken into consideration during the installation.

It has proved to be convenient for at least one, preferably both, of the at least two holding devices to have at least one flexible tongue, preferably at least two flexible tongues, which is comprised by the at least one catch mechanism and which is formed in such a way that a free end of the at least one flexible tongue can be mounted on a projection of the at least one guide rail, whereby a tensile force can be applied to the holding device in the direction of the at least one guide rail, preferably wherein

- the at least one flexible tongue is formed bent at least in regions, and/or
- the at least one flexible tongue has at least one sloping surface, and/or
- at least two flexible tongues are provided, which are arranged spaced apart from each other on the holding device, and/or protrude to different extents from a contact surface of the holding device.

By mounting the at least two holding devices on the projections via the free ends of the at least two flexible tongues, in particular in the case of projections and/or flexible tongues formed sloping in regions, the at least one screen is pushed in the direction of the at least one guide rail, thereby promoting a positionally stable positioning of the at least one screen on the at least one guide rail.

If the at least two flexible tongues are spaced apart from each other in the vertical and/or in the horizontal direction, a torque is particularly advantageously transmitted to the at least one guide rail via the at least two flexible tongues.

According to an advantageous embodiment of the invention, the at least one guide device comprises a connection device which connects the running mechanism to the fastening device, preferably wherein the connection device is formed bracket-shaped and/or is arranged on an outer side of the at least one guide device, particularly preferably on an outer side facing downwards or upwards in the use position of the at least one guide device.

A compact guide assembly can be achieved through a bracket-shaped connection device, wherein a larger region of the at least one guide rail is concealed by at least one screen.

It has proved to be advantageous for the guide assembly to comprise at least one further guide rail separate from the at least one guide rail or at least one guide rail section separate from the at least one guide rail, on which the at least one guide device can be arranged.

This makes it possible for the at least one guide device to travel away from the at least one guide rail, thereby particularly promoting an installation and/or deinstallation of the at least one screen as the at least one screen is freely removable or attachable without a guide device arranged in front of the screen.

An advantageous variant consists in that the guide assembly has at least one carrier, on which the at least one sliding door or folding sliding door can be pivotably mounted, and wherein the guide assembly has at least one carrier rail, on which the at least one carrier can be or is displaceably mounted and which is or can be arranged transverse with respect to the at least one guide rail.

The at least one carrier guarantees a stable sliding door or folding sliding door which can be moved easily along the at least one guide rail and/or the at least one guide rail and/or the at least one further guide rail.

It is particularly preferred for the at least one screen to cover a long side of the at least one guide rail, preferably wherein the at least one screen covers the long side of the at least one guide rail only in regions, particularly preferably wherein at least one longitudinal strip of the at least one guide rail is not covered by the at least one screen and a connection device of the at least one guide device, which connects the running mechanism to the fastening device, is or can be arranged at the height of the at least one longitudinal strip.

In an embodiment of the invention, the piece of furniture has a top panel, the at least one guide rail is arranged above the top panel, and the at least one screen covers the at least one guide rail in such a way that a gap is arranged between an underside of the screen and the upper side of the top panel, via which the at least one guide rail is accessible.

By covering the guide rail with the at least one screen, an esthetically appealing piece of furniture is provided, wherein at least one guide device can be arranged such that it can travel on the at least one guide rail via the gap.

A distance between the upper side of the top panel and the underside of the screen—which defines the gap—can be adjusted in such a way that the at least one connection device can be arranged in the gap and the running mechanism can be connected to the fastening device and/or the largest possible region of the at least one guide rail can be covered by the screen.

It has proved to be convenient for at least one ejection device to be arranged on the at least one sliding door or folding sliding door, and at least one restraining means, preferably a metal plate, for the at least one ejection device is arranged on a front side of the screen which lies opposite a rear side on which the at least two holding devices are installed.

The at least one ejection device makes it possible to unfold the at least one sliding door or folding sliding door from a coplanar closed position when pressure is exerted on the at least one sliding door or folding sliding door.

At least one restraining means makes it possible for the at least one sliding door or folding sliding door to remain in the coplanar closed position, due to an ejection device remaining in a locking state, until the exertion of pressure on the at least one sliding door or folding sliding door is generated.

According to a preferred embodiment of the invention, the piece of furniture has at least one interior which can be covered by the at least one sliding door or folding sliding door at least in regions, and in which kitchen furniture and kitchen appliances can be or are arranged and/or has at least one cavity extending in a depth direction of the piece of furniture for at least partially receiving the at least one sliding door or folding sliding door.

The at least one cavity makes it possible to hide the at least one sliding door or folding sliding door, wherein an access into the at least one interior is made easier and an esthetically appealing piece of furniture is provided.

Alternatively it is possible, in a further method step before the at least one screen is fastened on the at least one guide rail, for the at least one guide device displaceably mounted on the at least one guide rail via the running mechanism to be displaced onto a further guide rail separate from the at least one guide rail or onto a guide rail section separate from the at least one guide rail.

By displacing the at least one guide device into a region separate from the at least one guide rail, the at least one screen is exposed or is not covered by the at least one guide device. As a result, an installation of the at least one screen on the at least one guide rail is made easier and the ease of use of the at least one guide assembly is increased.

According to an advantageous design of the invention it is provided, in a further method step, that the at least one guide device displaceably mounted on the at least one guide rail via the running mechanism is fastened on the at least one sliding door or folding sliding door by means of the fastening device.

This makes a guiding via the at least one guide device possible when the at least one sliding door or folding sliding door is moved, wherein the movement follows a defined path without the sliding door or folding sliding door tilting or wearing during use.

BRIEF DESCRIPTION OF THE DRAWINGS

Further details and advantages of the present invention are explained in more detail below by means of the description of the figures with reference to the embodiments represented in the drawings. There are shown in.

DETAILED DESCRIPTION OF THE INVENTION

Figure 1:
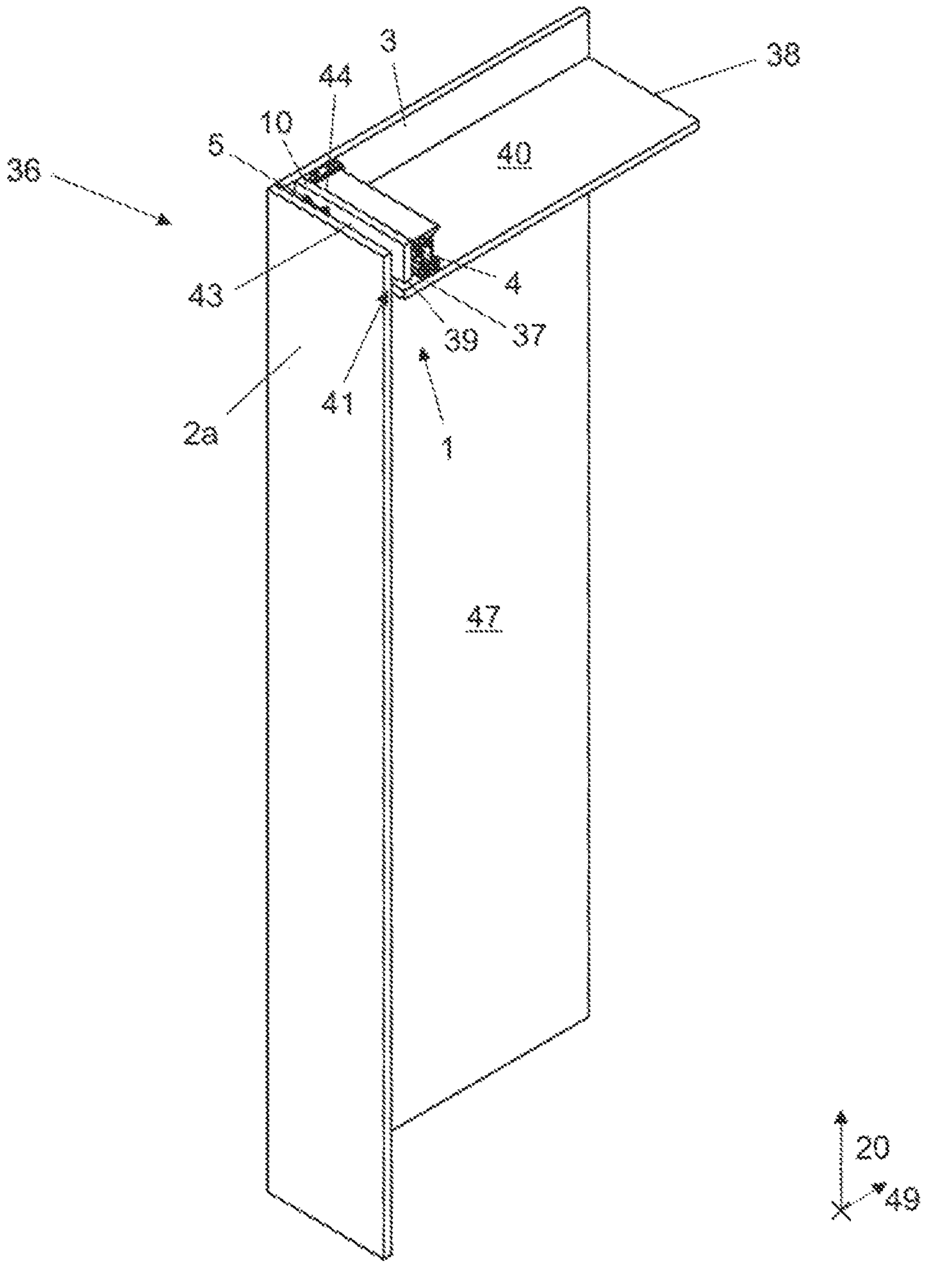
FIG. 1 shows a section of a piece of furniture with a section of a guide assembly and a sliding door in a perspective view.

FIG. 1 shows a section of a piece of furniture 36 with a guide assembly 1 for guiding a sliding door 2*a* relative to a stationary furniture part 3 comprising a guide rail 4 fastened on the stationary furniture part 3 and a guide device 5 which is partially covered by a screen 10.

The piece of furniture 36 has a top panel 38. The guide rail 4 is arranged above the top panel 38. The screen 10 covers the guide rail 4 in such a way that a gap 41 is arranged between an underside 39 of the screen 10 and an upper side 40 of the top panel 38, via which the guide rail 4 is accessible.

Figure 2A:
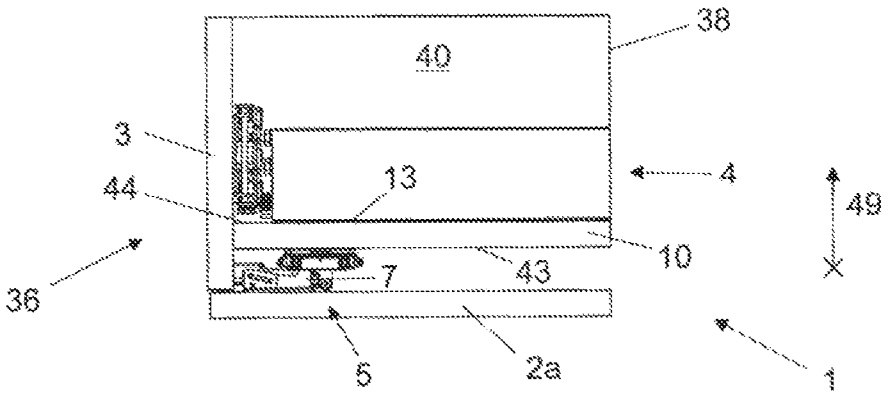
FIGS. 2*a*-2*b* show the section of a piece of furniture according to FIG. 1 in a view from above and from the side.

FIG. 2*a* shows the section of the piece of furniture 36 from above. The guide device 5 has travelled in the direction of the stationary furniture part 3 as far as a stop. The sliding door 2*a* is in a closed position.

The guide rail 4 is connected to the stationary furniture part 3 via screw connections as well as a receiver arranged on the stationary furniture part 3.

Figure 2B:
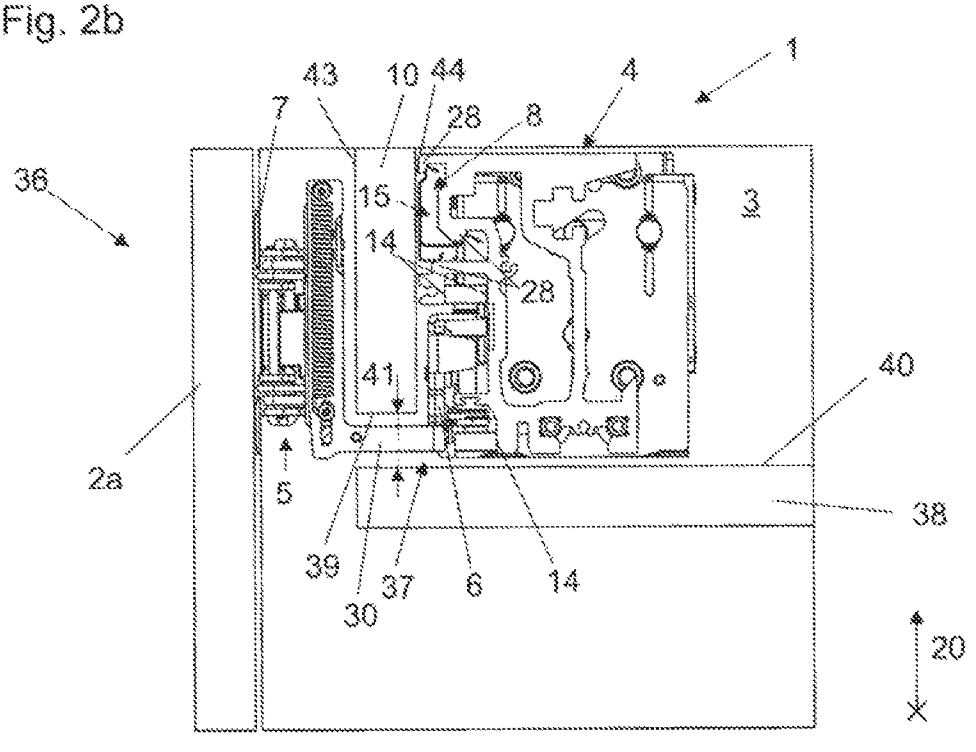

FIG. 2*b* shows the section of the piece of furniture 36 from the side, wherein the guide device 5 has a running mechanism 6 which is mounted displaceably on the guide rail 4 and a fastening device 7 for fastening the guide device 5 on the sliding door 2*a*.

The running mechanism 6 is arranged on three tracks 14 of the guide rail 4. The running mechanism 6 has four rolling bodies for a rolling movement of the running mechanism on the three tracks 14. The number of rolling bodies is as desired, however.

Two holding devices 8, wherein the second holding device 8 is concealed by the first holding device 8 in the view, are arranged between the guide rail 4 and the screen 10. The holding devices 8 connect the guide rail 4 to the screen 10.

The guide device 5 comprises a connection device 30 which connects the running mechanism 6 to the fastening device 7 and is arranged in the gap 41. The connection device 30 is formed bracket-shaped. In a use position of the guide device 5, the connection device 30 is arranged on an outer side of the guide device 5 facing downwards.

Figure 3A:
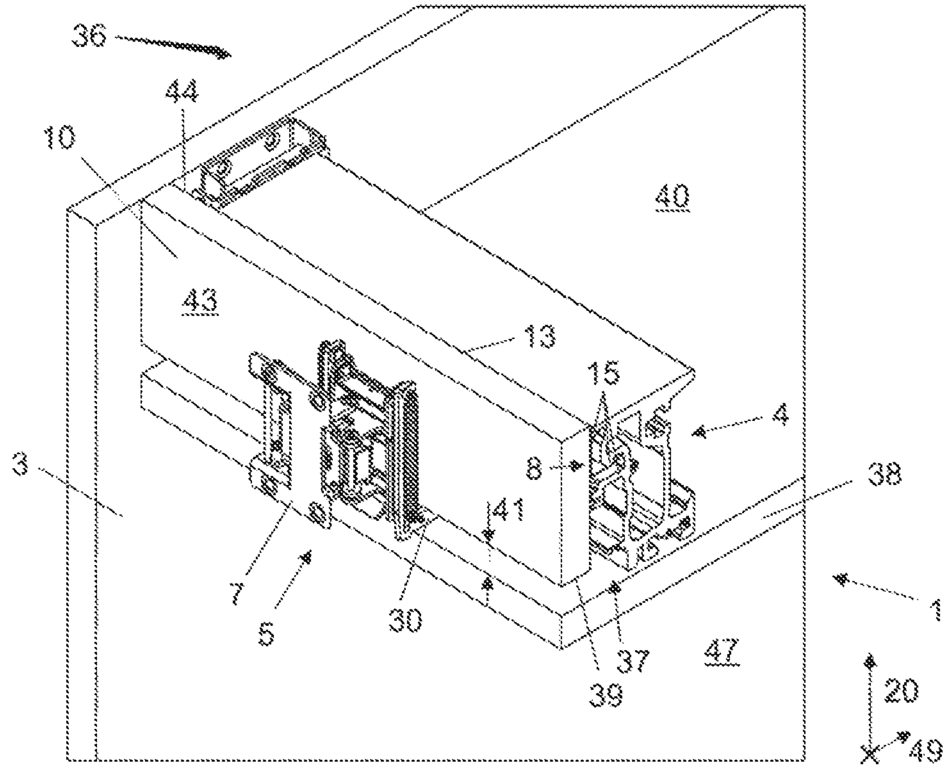
FIGS. 3*a*-3*b* show a section of a piece of furniture in an enlarged representation without sliding door and with a guide device moved partially along a guide rail according to a preferred embodiment in a perspective view and a view from above.

FIG. 3*a* shows the section of the piece of furniture 36 in enlarged representation, wherein the guide device 5 has travelled a distance away from the stationary furniture part 3.

A sliding door 2*a* or folding sliding door 2*b* can be fastened on the fastening device 7 of the guide device 5, preferably via fastening means.

Figure 3B:
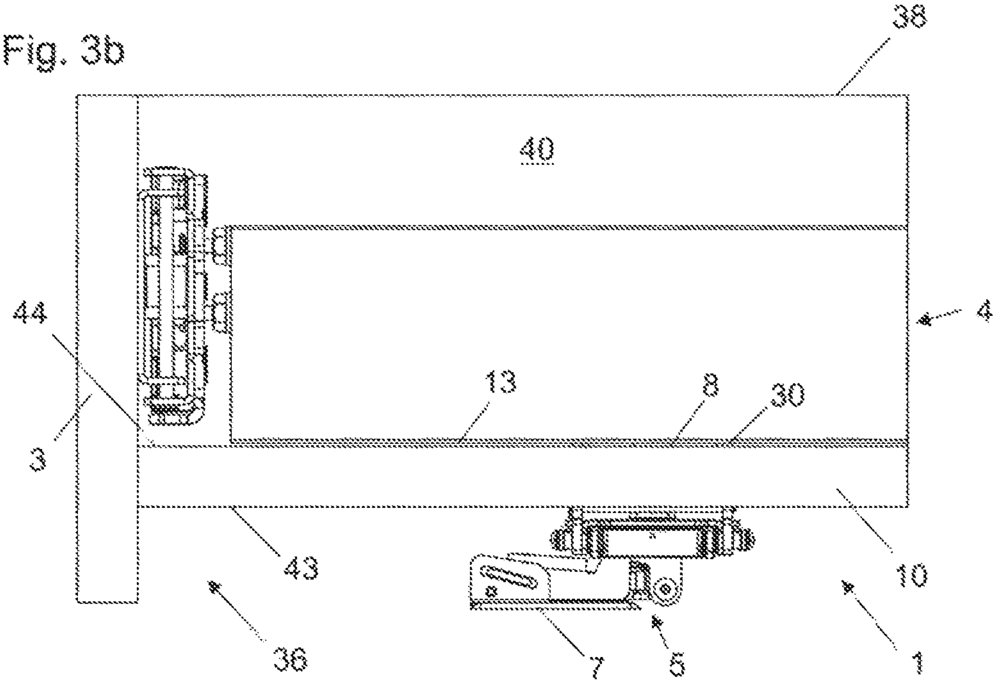

FIG. 3*b* shows the section of the piece of furniture 36 in enlarged representation from above. The screen 10 has a front side 43 and a rear side 44, wherein the rear side 44 is facing the guide rail 4 and the front side 43 is facing the fastening device 7.

Figure 4A:
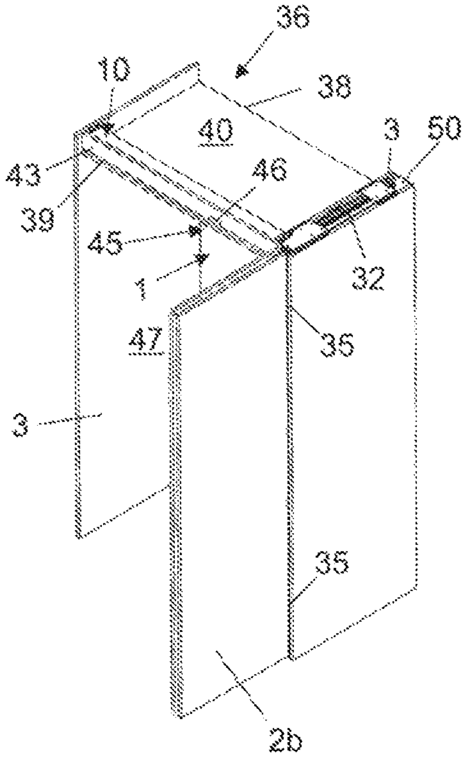
FIGS. 4*a*-4*b* show a piece of furniture according to a preferred embodiment with a guide assembly and a folding sliding door in a perspective view with and without a screen.

FIG. 4*a* shows the piece of furniture 36 comprising the stationary furniture part 3, a folding sliding door 2*b* instead of the sliding door 2*a* according to FIG. 1 and a guide assembly 1 for guiding the folding sliding door 2*b* relative to the stationary furniture part 3.

The piece of furniture 36 has an interior 47 which can be covered by the folding sliding door 2*b* and in which kitchen furniture and kitchen appliances can be arranged. The piece of furniture has a cavity 50 extending in a depth direction 49 of the piece of furniture 36 for receiving the folding sliding door 2*b*.

An ejection device (not visible in the representation) is arranged on the folding sliding door 2*b*, wherein the ejection device is arranged between two panels of the folding sliding door 2*b* and is connected to one of the two panels. A restraint 45, in the form of a metal plate 46, for the ejection device is arranged on the front side 43 of the screen 10.

The screen 10 is arranged on the piece of furniture 36, wherein the holding devices 8 are installed on the screen 10 via installing sections 9. The holding devices 8 are fastened on the guide rail 4 by catch mechanisms 11, so that the screen 10 is held on the guide rail 4.

The folding sliding door 2*b* is guided via the guide rail 4 arranged at the top of the piece of furniture 36. However, the folding sliding door 2*b* can in general also be guided, for example, via a guide assembly—e.g. in the form of a further rail—arranged at the bottom of the piece of furniture 36.

Figure 4B:
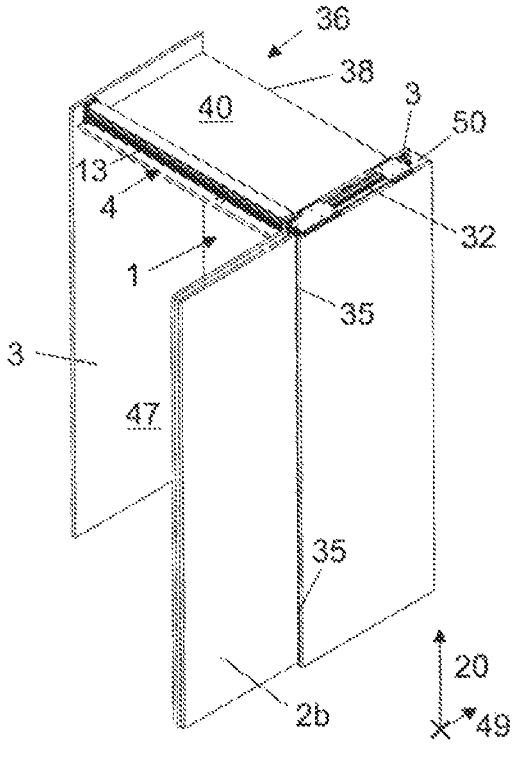

FIG. 4*b* shows the piece of furniture 36 without screen 10, wherein the guide rail 4 is exposed. The folding sliding door 2*b* has travelled along the side of the guide rail 4, whereby an easy installation of the screen 10 on the guide rail 4 via the holding devices 8 is made possible.

Figure 5A:
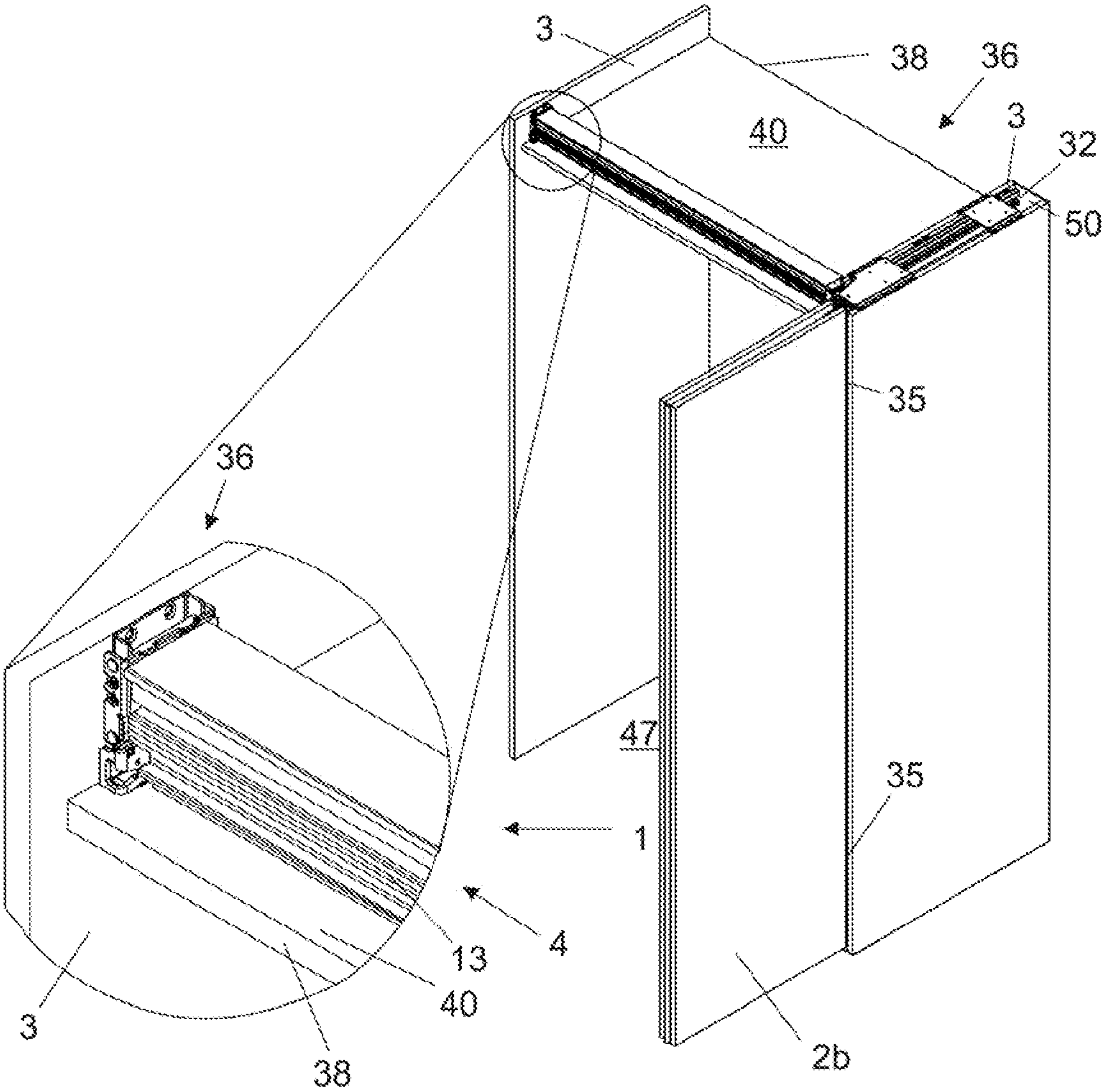
FIGS. 5*a*-5*b* show the piece of furniture according to the embodiment shown in FIG. 4*b* with an enlarged detail section of a fastening of the guide rail on the piece of furniture in a perspective view and a schematically represented guide assembly.

FIG. 5*a* shows the piece of furniture 36 without screen 10 in enlarged representation with a detail view of the guide rail 4, which is fixed on the stationary furniture part 3 and is arranged above the top side 40 of the top panel 38.

Figure 5B:
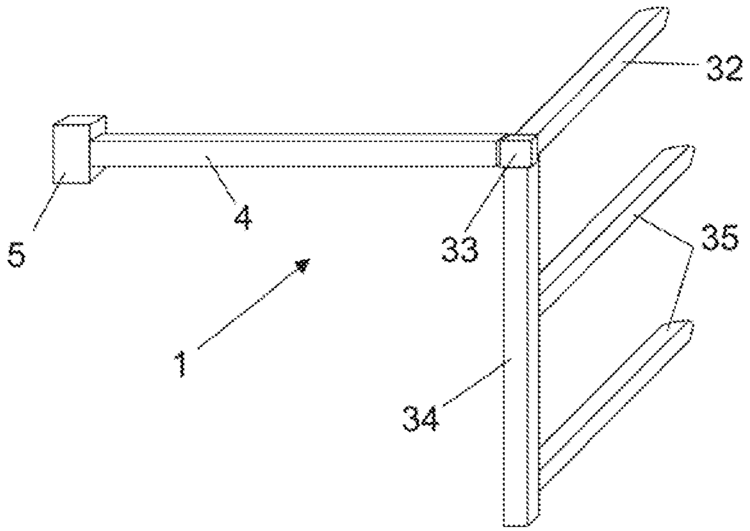

FIG. 5*b* shows the guide assembly 1 schematically represented, wherein a further (second) guide rail 32 separate from the (first) guide rail 4 and a guide rail section 33 separate from the guide rail 4 are present to the right of the guide rail 4, on which the guide device 5 is arranged.

The folding sliding door 2*b* is arranged with one of the two panels on a carrier 34. The guide device 5, which is connected to the second panel, can be moved onto the separate guide rail section 33 arranged on the carrier 34. The folding sliding door 2*b* can be moved from the separate guide rail section 33 onto the further guide rail 32 in order, for example, to be able to be brought into a shaft.

When the folding sliding door 2*b* travels along the further guide rail 32, the carrier 34 is guided along two carrier rails 35.

The guide assembly 1 contains the carrier 34, on which the sliding door 2*a* or folding sliding door 2*b* can be pivotably mounted. The guide assembly 1 has two carrier rails 35, on which the carrier 34 is displaceably mounted and which are arranged transverse with respect to the guide rail 4.

Figure 6A:
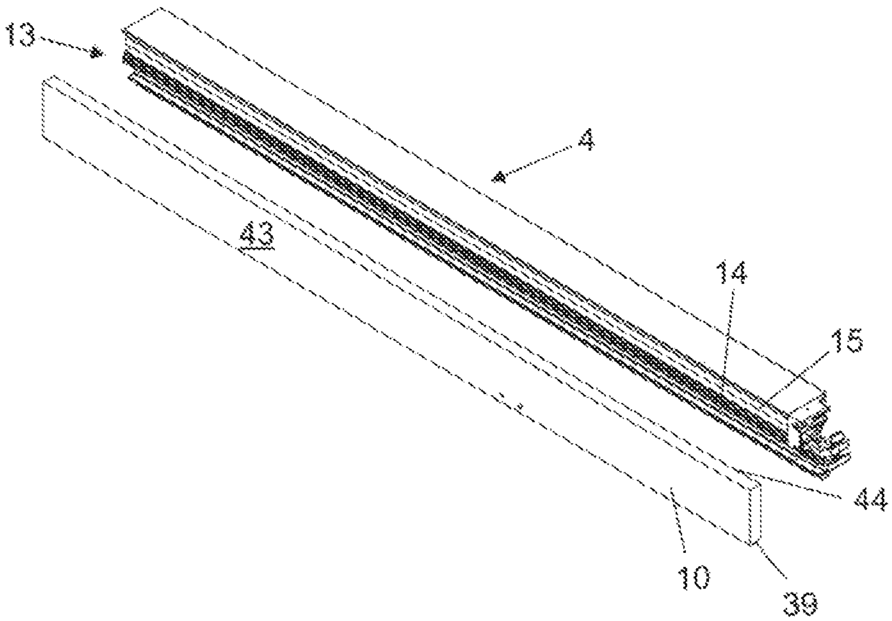
FIG. 6*a* shows a guide rail and a screen in a state before the screen is installed on the guide rail via holding devices according to a preferred embodiment.

FIG. 6*a* shows the guide rail 4 and the screen 10 from the front in a deinstalled state. The restraining means 45 can be attached to the front side 43 of the screen 10 via two holes.

The guide rail 4 has a long side 13 with three tracks 14 for the running mechanism 6, wherein a holding element 15, which can be connected to the catch mechanism 11 of the holding devices 8, is provided on the long side 13 in order to fasten the holding devices 8 on the guide rail 4.

Figure 6B:
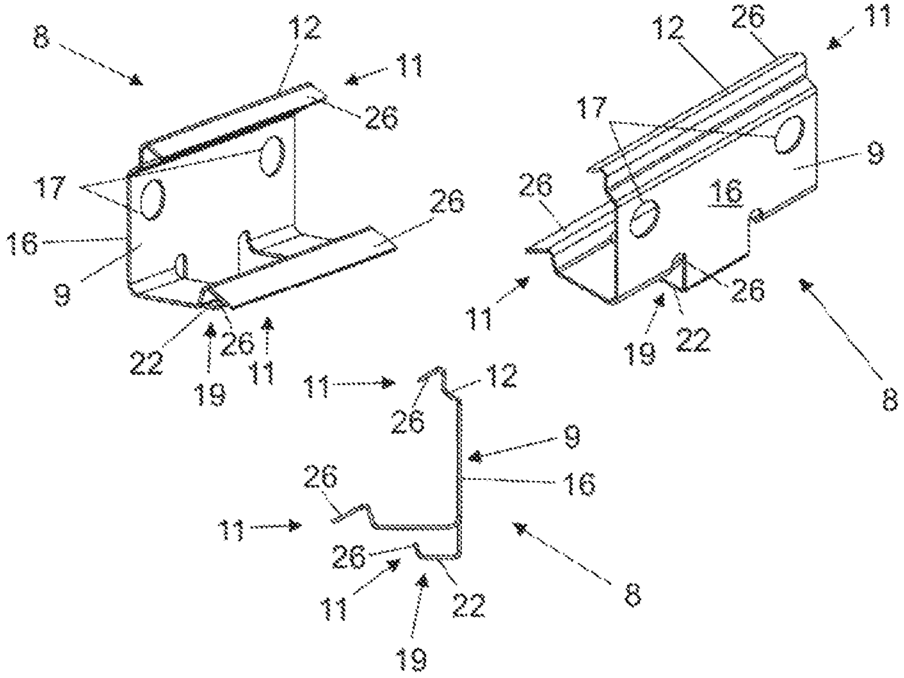
FIG. 6*b* shows a holding device for installing a screen on a guide rail in a perspective view from the front and from behind as well as a view from the side.

FIG. 6*b* shows a holding device 8 in three views. The holding device 8 has an installing section 9 for installing the holding device 8 on the screen 10 and three catch mechanisms 11. The holding device 8 can be fastened on the guide rail 4 by means of the catch mechanisms 11.

The holding device 8 consists of a sheet metal bent part 12. The sheet metal bent part 12 can for example be produced by a punching machine and then by a bending process.

The holding device 8 has a contact surface 16 which is comprised by the installing section 9 and can be brought into contact with the guide rail 4.

The holding device 8 has two openings 17 for receiving an installing means, with which the holding device 8 can be installed on the screen 10. The two openings 17 are formed in the installing section 9. The number of openings 17 is in general as desired.

Figure 7:
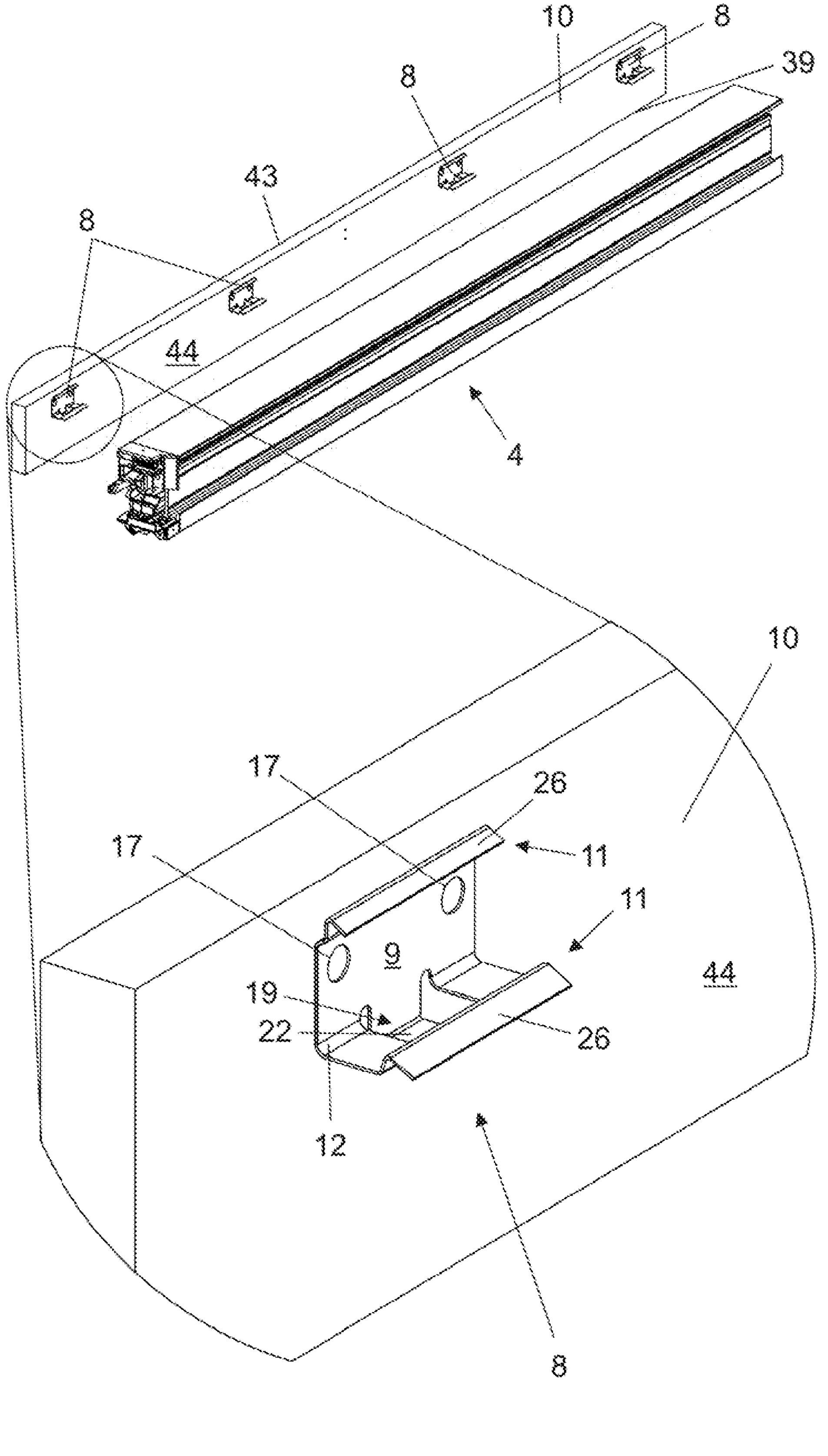
FIG. 7 shows a screen with four holding devices for installation on a guide rail with an enlarged detail section of a holding device in a perspective view.

FIG. 7 shows the guide rail 4 and the screen 10 from the rear side 44, wherein four holding devices 8 are installed on the rear side 44.

In an enlarged detail section the arrangement of the holding device 8 on the screen 10 can be seen. The contact surface 16 of the installing section 9 rests flat against the rear side 44 of the screen 10. The catch mechanisms 11 protrude transversely from the rear side 44 and can be arranged on the guide rail 4.

Figure 8A:
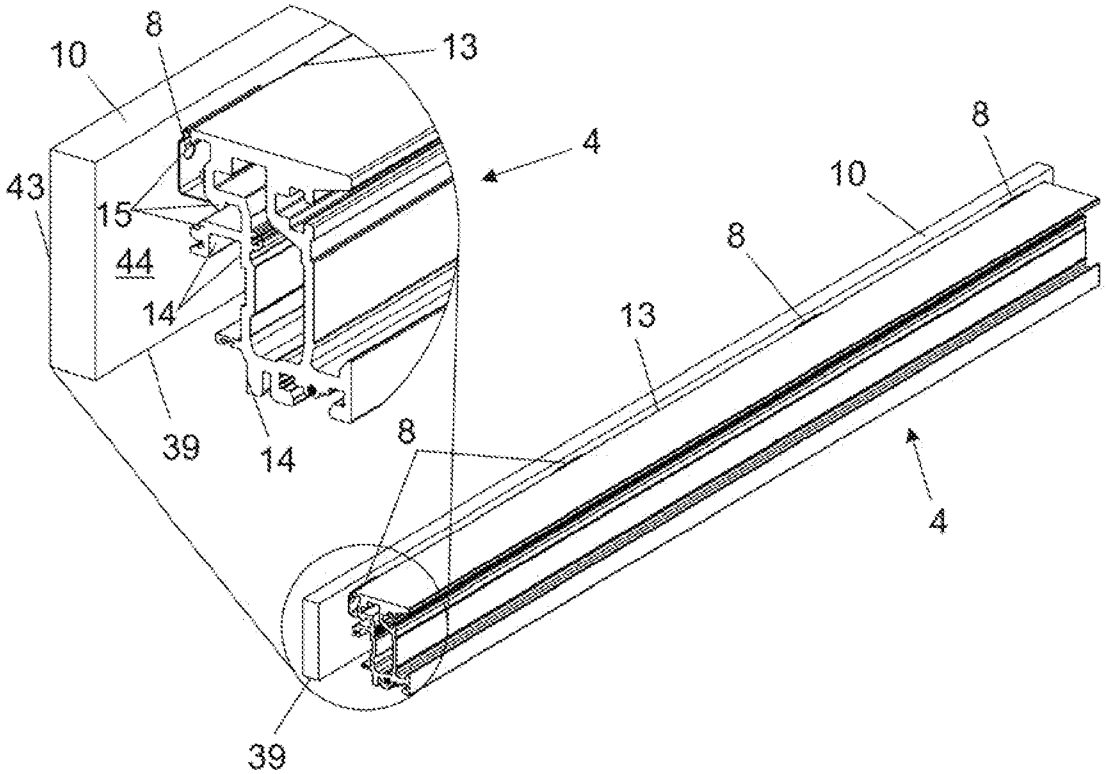
FIGS. 8*a*-8*b* show a screen which is installed on a guide rail, with an enlarged detail section, wherein a catch mechanism contacts a holding element for the first time, in a perspective view and a view from the side with enlarged detail section.

FIG. 8*a* shows the screen 10, wherein the screen 10 is arranged on the guide rail 4. An enlarged detail section shows the holding device 8 contacting the guide rail 4 in a perspective view from the side.

Figure 8B:
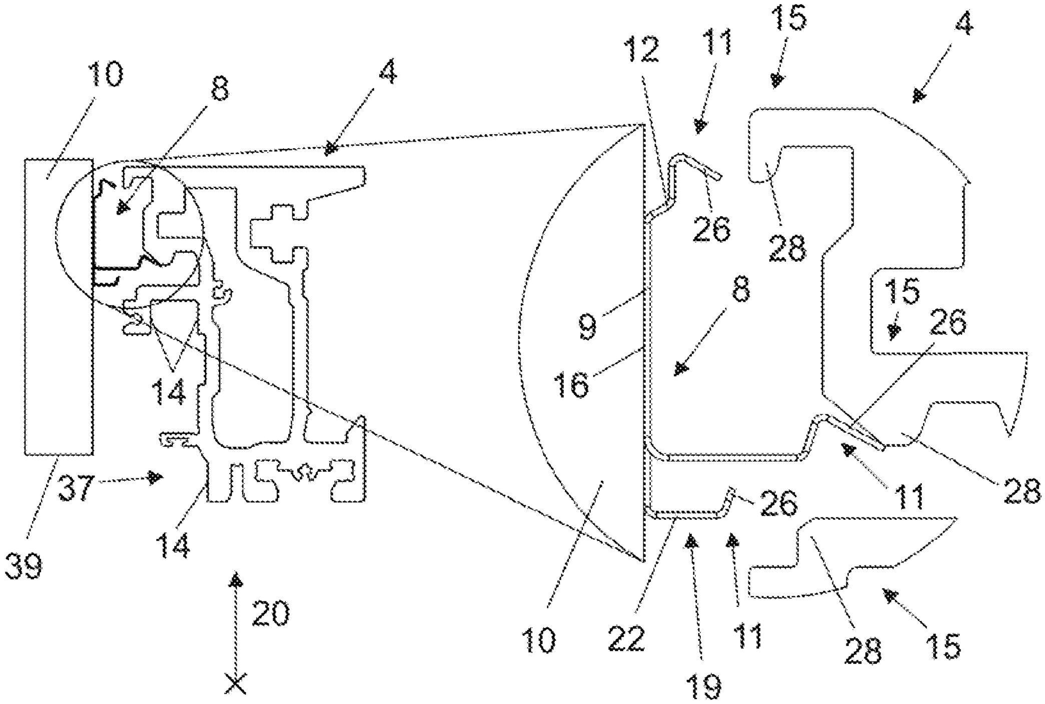

FIG. 8*b* shows the holding devices 8 contacting the guide rail 4 for the first time. The holding device 8 has a support device 19 which is formed resilient and with which the holding device 8 can be supported in the vertical direction 20 on the at least one guide rail 4 in the use position.

The support device 19 has a cross web 22 protruding transversely with respect to a contact surface 16. A flat contact with the guide rail 4 in the installed state of the screen 10 is possible via the cross web 22.

The holding device 8 has three flexible tongues 26 which are comprised by the three catch mechanisms 11.

Figure 9A:
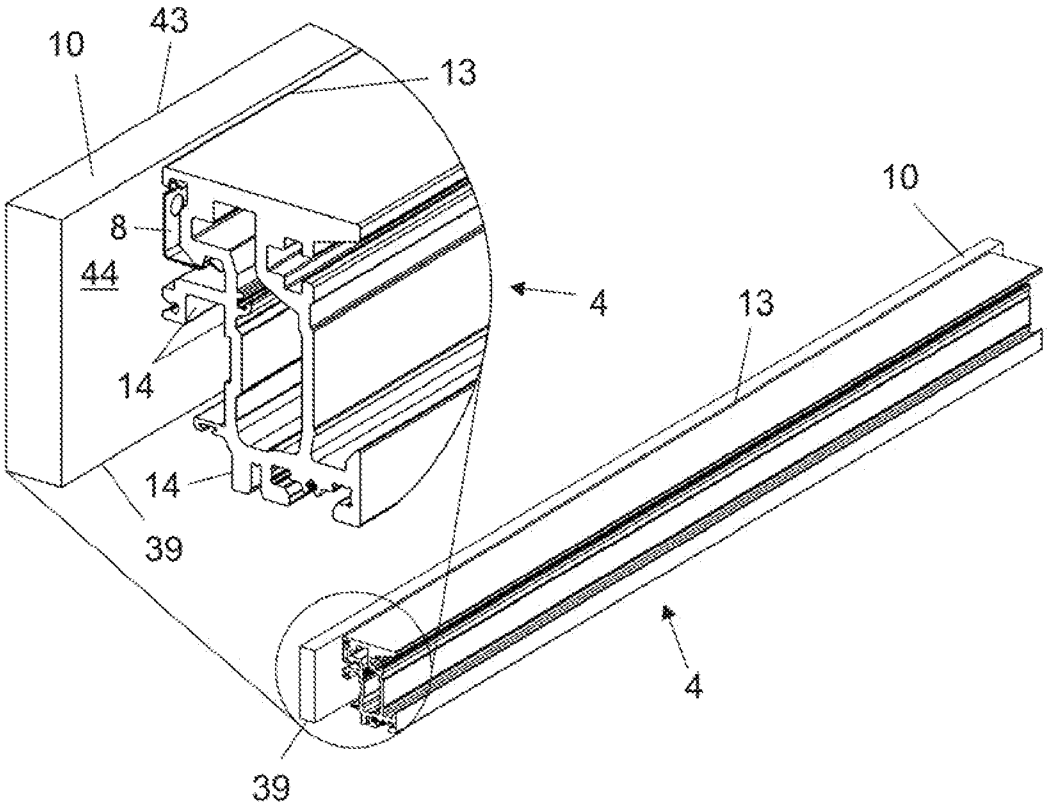
FIGS. 9*a*-9*b* show a screen which is installed on a guide rail, with an enlarged detail section, wherein two catch mechanisms and a support device contact three parts of the holding element, in a perspective view and a view from the side with enlarged detail section.

FIG. 9*a* differs from FIG. 8*a* only in that the screen 10 has been moved slightly further in the direction of the guide rail 4.

Figure 9B:
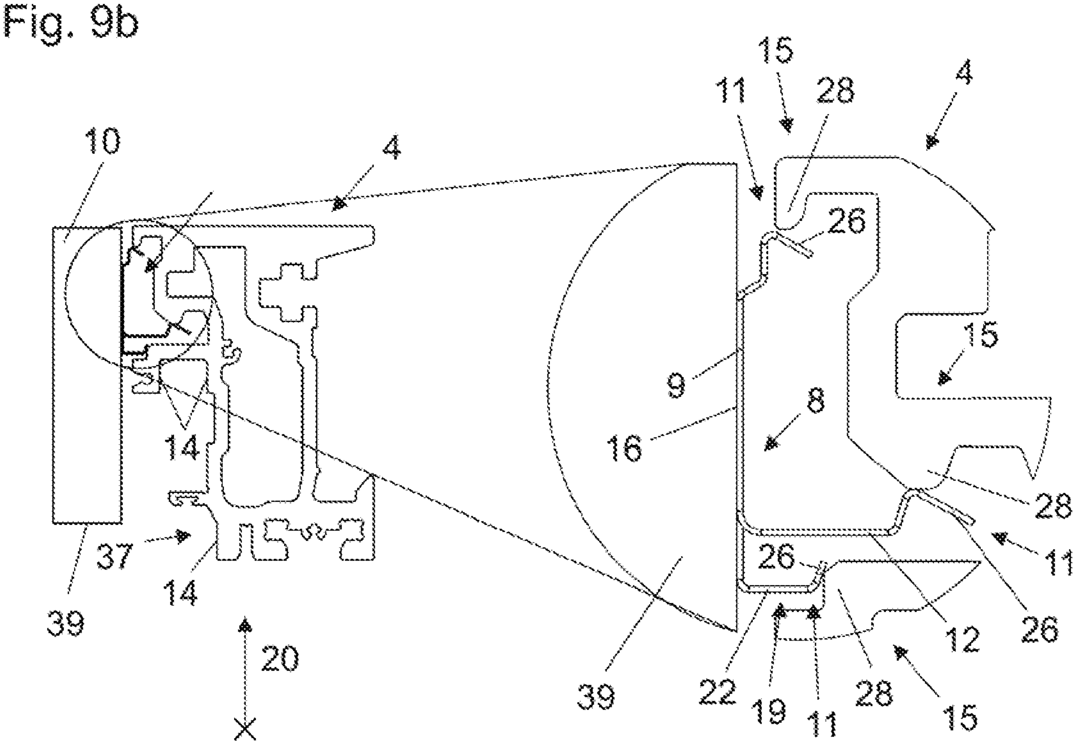

FIG. 9*b* shows how the screen 10 partially covers the long side 13 of the guide rail 4. A longitudinal strip 37 of the guide rail 4 is not covered by the screen 10. A connection device 30 of the guide device 5, which connects the running mechanism 6 to the fastening device 7, can be arranged at the height of the longitudinal strip 37.

Figure 10A:
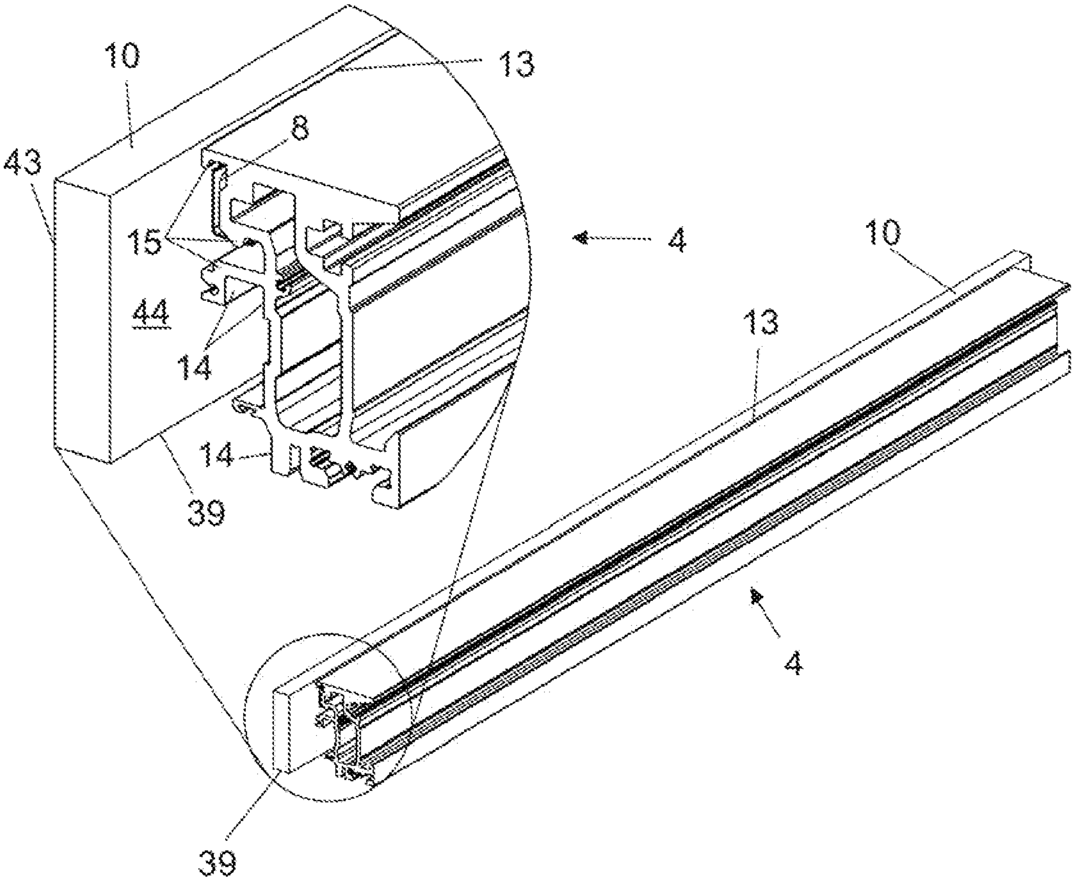
FIGS. 10*a*-10*b* show a screen which is installed on a guide rail, with an enlarged detail section, wherein the two catch mechanisms and the support device are arranged on the three parts of the holding element, in a perspective view and a view from the side with enlarged detail section.

FIG. 10*a* shows a guide rail 4 with a screen 10 installed via four holding devices 8 (three holding devices 8 are concealed by the guide rail 4).

Figure 10B:
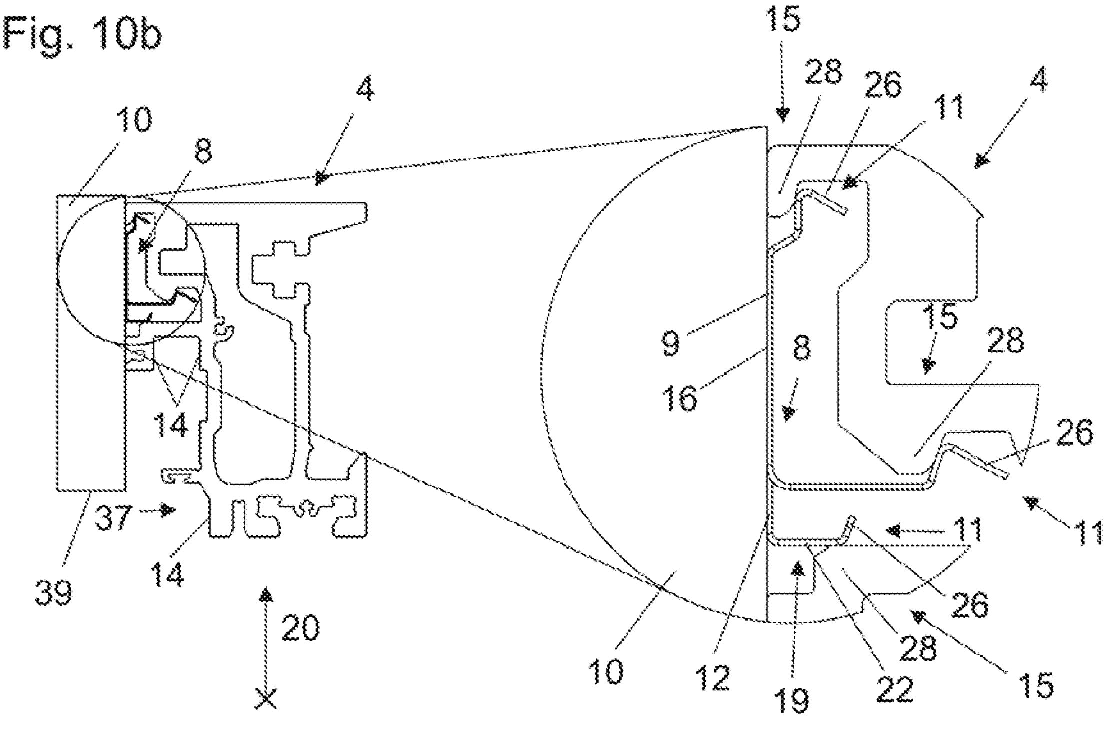

FIG. 10*b* shows a side view of the screen 10 installed on the guide rail 4 via the holding devices 8.

The guide rail 4 has a holding element 15 which can be connected to the catch mechanisms 11 of the holding device 8.

The three flexible tongues 26 are formed in such a way that two free ends of two flexible tongues 26 are mounted on two projections 28 of the holding element 15 of the guide rail 4, whereby a tensile force is applied to the holding device 8 in the direction of the guide rail 4. An unintentional detachment of the screen 10 from the guide rail 4 is thereby prevented. The three flexible tongues 26 are formed bent in regions. Two of the three flexible tongues 26 have two sloping surfaces and the third flexible tongue 26 has one sloping surface. The three flexible tongues 26 are arranged on the holding device 8 spaced apart from each other in the vertical direction 20 and protrude to different extents from the contact surface 16 of the holding device 8.

Figure 11A:
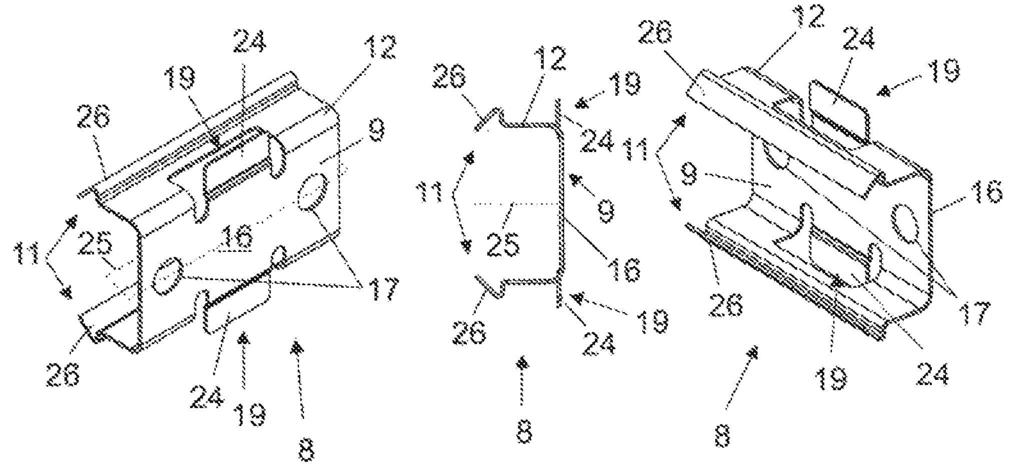
FIGS. 11*a*-11*c* show three further preferred embodiments of a holding device, in each case in two perspective views from behind and the front and a view from the side.

FIG. 11*a* shows a holding device 8 according to a further preferred embodiment in three views, wherein the holding device 8 is formed symmetrical with respect to a center plane 25.

The holding device 8 has two tabs 24 arranged parallel, offset via a step, to the contact surface 16. The holding device 8 is formed mirror-symmetrical about the center plane 25.

The holding device 8 comprises two flexible tongues 26, wherein the flexible tongues 26 are formed bent and resilient.

Figure 11B:
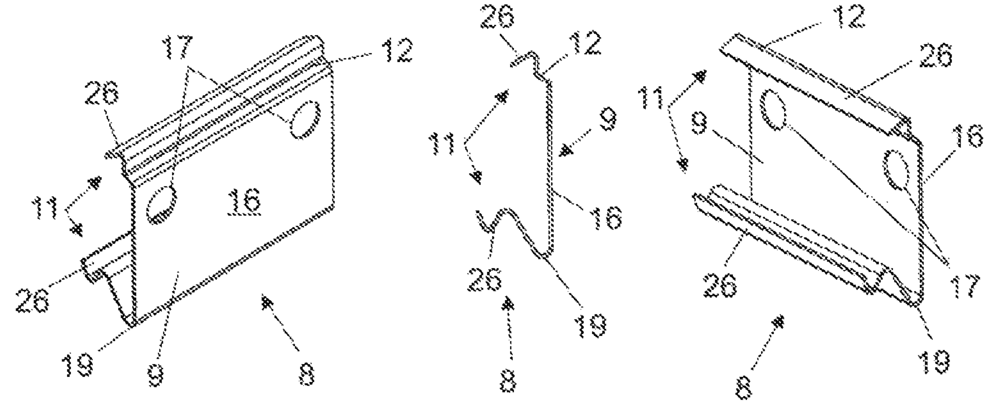

FIG. 11*b* shows a holding device 8 according to a further preferred embodiment, wherein the support device 19 is formed by a radius and no tab 24 is provided.

The lower flexible tongue 26 has three sloping surfaces and the upper flexible tongue 26 has one sloping surface.

The two openings 17 are shifted upwards along the contact surface 16 compared with the holding device 8 according to FIG. 11*a*. A favorable transfer of force via the lower flexible tongue 26 is thereby effected, as a larger torque can be transmitted from the lower catch mechanism 11 of the screen 10 to the guide rail 4.

The holding device 8 can for example be molded from aluminum sheet, steel sheet and/or from plastic.

Figure 11C:
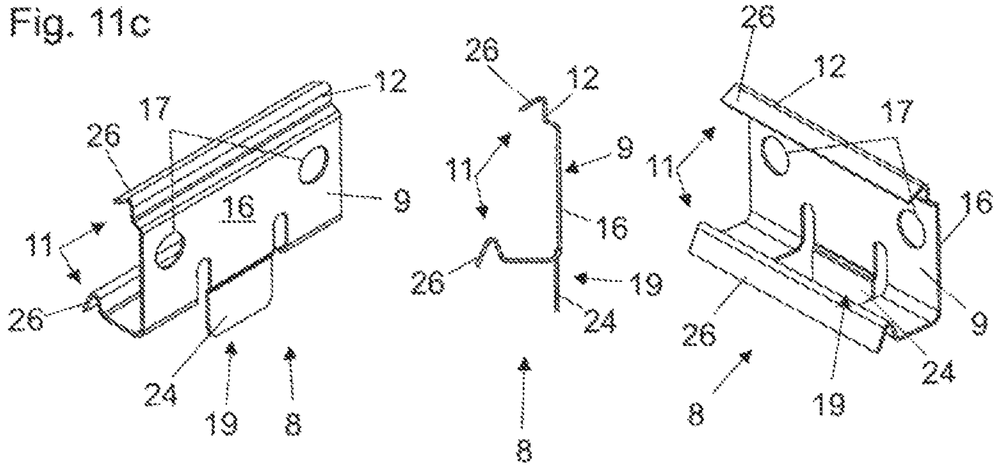

FIG. 11*c* shows a holding device 8 according to a further preferred embodiment with two flexible tongues 26 and one tab 24 which is arranged parallel, offset via a step, to the contact surface 16.

The holding device 8 can be positioned on the guide rail 4 in a positionally stable manner via two catch mechanisms 11, wherein a supporting of the holding device 8 on the guide rail 4 in the vertical direction 20 can be generated via the tab 24.

Figure 12A:
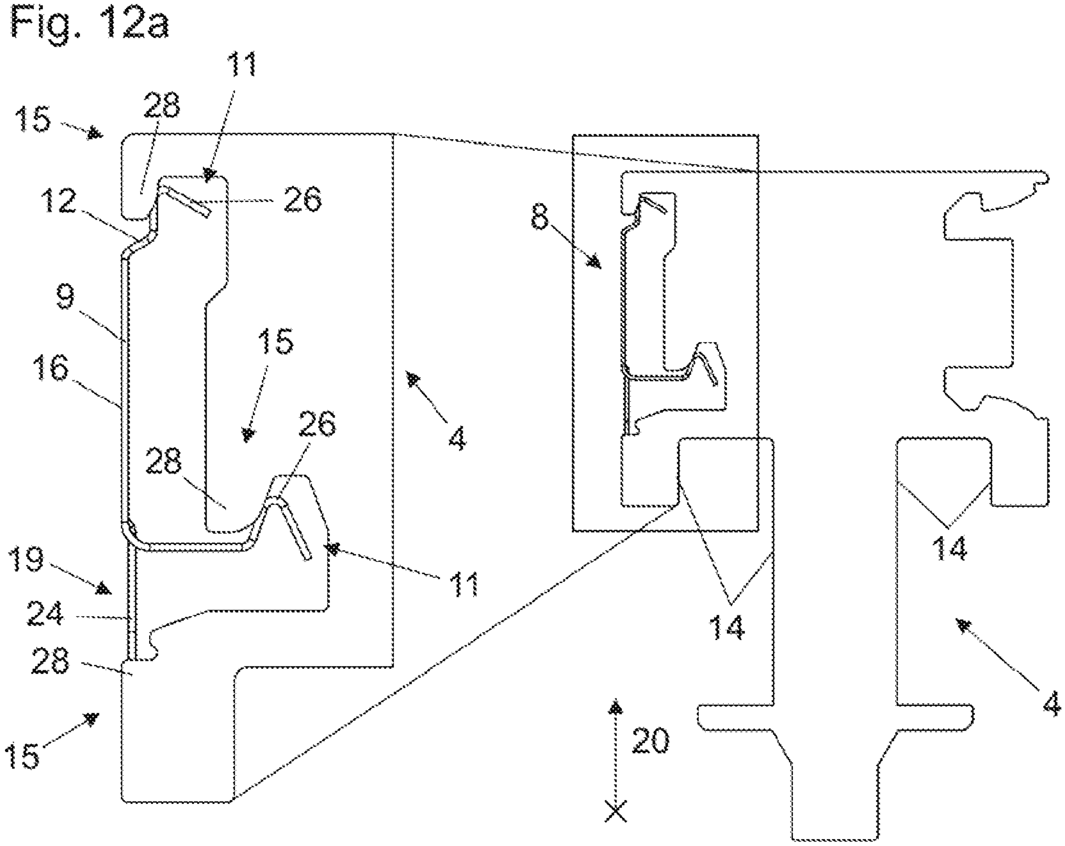
FIGS. 12*a*-12*b* show two guide rails according to two further preferred embodiments with a holding device according to the embodiment according to FIG. 11*a* and FIG. 11*c* arranged on the guide rail, with an enlarged detail section in a view from the side.

FIG. 12*a* shows a guide rail 4 according to a further preferred embodiment, wherein the guide rail 4 is formed symmetrical and has two tracks 14.

A lower section of the guide rail 4, which protrudes transversely from the track 14, can be utilized for the arrangement of the guide device 5, so that the guide device 5 is prevented from tilting away from the guide rail 4 and a low-friction rolling of the guide device 5 along the guide rail 4 is promoted.

A holding device 8 according to the embodiment shown in FIG. 11*c* is installed on the guide rail 4. An enlarged detail section is represented on the left.

The support device 19 in the form of a tab 24 is supported on a holding element 15 in the form of a projection 28 of the guide rail 4.

Two flexible tongues 26 are supported on two further projections 28 of the guide rail 4, whereby a screen 10 to be installed on the holding device 8 is pushed in the direction of the guide rail 4.

Figure 12B:
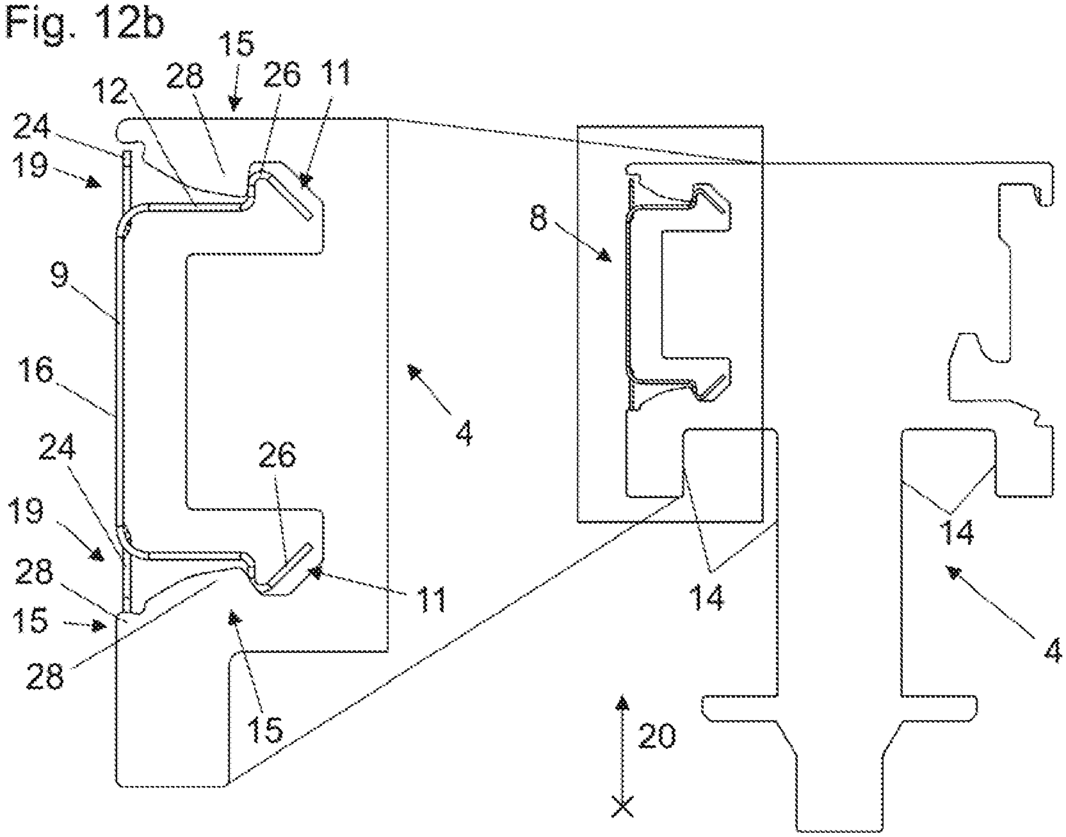

FIG. 12*b* shows an installed holding device 8 according to the embodiment shown in FIG. 11*a* on a guide rail 4 according to a further preferred embodiment, wherein a supporting of the lower tab 28 on a projection 28 of the guide rail 4 can be seen in the enlarged view arranged on the left.

The symmetrically arranged flexible tongues 26 are arranged on two further projections 28 of the guide rail 4 and prevent the holding device 8 from unintentionally slipping out of the guide rail 4. A positionally stable arrangement of the screen 10 on the guide rail 4 is thereby promoted.

By way of example, a screen 10 can be installed on the guide rail 4 via the holding device 8 as follows:

- the guide rail 4 is fastened on the stationary furniture part 3 above a top panel 38 of the piece of furniture 36,
- the holding devices 8 are installed on the screen 10 via the installing sections 9,
- the running mechanism 6 is arranged on the guide rail 4,
- the guide device 5 displaceably mounted on the guide rail 4 via the running mechanism 6 is fastened on the sliding door 2*a* or folding sliding door 2*b* by means of the fastening device 7,
- the guide device 5 displaceably mounted on the guide rail 4 via the running mechanism 6 is displaced onto a further guide rail 32 separate from the guide rail 4 or onto a guide rail section 33 separate from the guide rail 4 before the screen 10 is fastened on the guide rail 4,
- the screen 10 is fastened on the guide rail 4 by means of the catch mechanisms 11 of the holding devices 8.

The invention claimed is:

1. A guide assembly for guiding a sliding door or folding sliding door relative to a stationary furniture part, the guide assembly comprising:

a guide rail to be fastened to the stationary furniture part, a guide device including a running mechanism to be mounted displaceably on the guide rail, and a fastening device for fastening the guide device to the sliding door or folding sliding door, and at least two holding devices each having:

an installing section for allowing installation of a respective one of the at least two holding devices onto a screen, and a catch mechanism configured to fasten the respective one of the at least two holding devices to the guide rail, wherein at least one of the at least two holding devices has a sheet metal bent part, wherein the installing section of the at least one of the at least two holding devices has a contact surface to be brought into contact with a rear side of the screen, and wherein the catch mechanism of the at least one of the at least two holding devices comprises a flexible tongue formed such that a free end of the flexible tongue is mountable on a projection of the guide rail to allow a tensile force to be applied to the at least one of the at least two holding devices in a direction toward the guide rail.

2. The guide assembly according to claim 1, wherein the guide rail has a long side with a track for receiving the running mechanism, and a holding element is provided on the long side of the guide rail, the holding element being configured to be connected to the catch mechanism of each of the at least two holding devices to fasten the at least two holding devices to the guide rail.

3. The guide assembly according to claim 1, wherein each of the at least two holding devices:

has an opening for receiving a fastener, with which each of the at least two holding devices is to be installed on the screen, the opening being in the installing section, and has a support device with which each of the at least two holding devices is to be supported in a vertical direction on the guide rail in a use position of the guide rail, and is formed symmetrical with respect to a center plane.

4. The guide assembly according to claim 3, wherein the contact surface on the installing section is configured to be brought flatly into contact with the rear side of the screen.

5. The guide assembly according to claim 3, wherein the support device is resilient and has at least one of (i) a cross web protruding transversely with respect to a contact surface, and (ii) a tab arranged parallel offset via a step with respect to the contact surface.

6. The guide assembly according to claim 1, wherein the flexible tongue:

is at least partially bent, and has a sloping surface, and is a first flexible tongue, the at least one of the at least two holding devices having a second flexible tongue, the first flexible tongue and the second flexible tongue being arranged to have at least one of the following features:

spaced apart from each other on the at least one of the at least two holding devices, and protrude to different extents from the contact surface of the at least one of the at least two holding devices.

7. The guide assembly according to claim 1, wherein the guide device further includes a connection device connecting the running mechanism to the fastening device.

8. The guide assembly according to claim 7, wherein the connection device is bracket-shaped and/or is arranged on an outer side of the guide device facing downwards or upwards in a use position of the guide rail.

9. The guide assembly according to claim 1, wherein the guide rail is a first guide rail, the guide assembly further comprising a second guide rail separate from the first guide rail or a guide rail section separate from the first guide rail, the guide device being arranged on the second guide rail or the second guide rail section.

10. The guide assembly according to claim 1, further comprising:

a carrier on which the sliding door or the folding sliding door is to be pivotably mounted, and a carrier rail on which the carrier is to be displaceably mounted, the carrier rail being arranged transverse with respect to the guide rail.

11. A piece of furniture comprising:

a stationary furniture part, a sliding door or folding sliding door, the guide assembly according to claim 1, the guide assembly being configured to guide the sliding door or folding sliding door relative to the stationary furniture part, and a screen on which the at least two holding devices of the guide assembly are installed via the installing section of each respective one of the at least two holding devices, wherein the at least two holding devices are fastened to the guide rail by the respective catch mechanism to thereby hold the screen on the guide rail.

12. The piece of furniture according to claim 11, wherein the screen covers a long side of the guide rail.

13. The piece of furniture according to claim 12, wherein the screen only partially covers the long side of the guide rail, and a longitudinal strip of the guide rail is uncovered by the screen, the guide device further including a connection device connecting the running mechanism to the fastening device, the connection device being arranged at a height of the longitudinal strip.

14. The piece of furniture according to claim 11, further comprising a top panel, the guide rail being arranged above the top panel, and the screen being arranged such that a gap is formed between an underside of the screen and the upper side of the top panel, the guide rail being accessible via the gap.

15. The piece of furniture according to claim 11, further comprising an ejection device on the sliding door or folding sliding door, and a restraint for restraining the ejection device, the restraint being arranged on a front side of the screen opposite of a rear side on which the at least two holding devices are installed.

16. The piece of furniture according to claim 15, wherein the restraint is a metal plate for restraining the ejection device.

17. The piece of furniture according to claim 11, wherein the stationary furniture part has at least one of:

an interior to be at least partially covered by the sliding door or folding sliding door, and a cavity extending in a depth direction of the piece of furniture and configured to at least partially receive the sliding door or folding sliding door.

18. A method for installing the piece of furniture according to claim 11, the method comprising:

fastening the guide rail to the stationary furniture part, installing the at least two holding devices on the screen via the respective installing sections, and fastening the screen on the guide rail by the respective catch mechanism of each of the at least two holding devices.

19. The method according to claim 18, further comprising, before fastening the screen on the guide rail, displaceably mounting the guide device displaceably mounted on the guide rail via the running mechanism onto a second guide rail separate from the guide rail or onto a guide rail section separate from the guide rail.

20. The method according to claim 18, further comprising fastening the guide device displaceably mounted on the guide rail via the running mechanism on the sliding door or folding sliding door by the fastening device.

21. The method according to claim 18, wherein the fastening of the guide rail, the installing of the at least two holding devices, and the fastening of the screen are performed in chronological sequence in order as recited, and the guide rail is fastened to the stationary furniture part above a top panel of the piece of furniture.

22. The guide assembly according to claim 1, wherein each of the at least two holding devices is formed of a respective sheet metal bent part.

23. A guide assembly for guiding a sliding door or folding sliding door relative to a stationary furniture part, the guide assembly comprising:

a guide rail to be fastened to the stationary furniture part, a guide device including a running mechanism to be mounted displaceably on the guide rail, and a fastening device for fastening the guide device to the sliding door or folding sliding door, and at least two holding devices each having:

an installing section for allowing installation of a respective one of the at least two holding devices onto a screen, and a catch mechanism configured to fasten the respective one of the at least two holding devices to the guide rail, wherein at least one of the at least two holding devices has a sheet metal bent part, and wherein the guide device further includes a bracket-shaped connection device connecting the running mechanism to the fastening device, the connection device being arranged on an outer side of the guide device facing downwards in a use position of the guide rail.

24. A guide assembly for guiding a sliding door or folding sliding door relative to a stationary furniture part, the guide assembly comprising:

a guide rail to be fastened to the stationary furniture part, a guide device including a running mechanism to be mounted displaceably on the guide rail, and a fastening device for fastening the guide device to the sliding door or folding sliding door, and at least two holding devices each having:

an installing section for allowing installation of a respective one of the at least two holding devices onto a screen, and a catch mechanism configured to fasten the respective one of the at least two holding devices to the guide rail, wherein at least one of the at least two holding devices has:

a sheet metal bent part, a contact surface of the installing section to be brought into contact with a rear side of the screen, and a support device to support the at least one of the at least two holding devices in a vertical direction in a use position of the guide rail, the support device having a cross web protruding transversely with respect to the contact surface to prevent slipping of the screen in the use position of the guide rail.

* * * * *